(12) United States Patent
Kurita et al.

(10) Patent No.: US 6,987,713 B2
(45) Date of Patent: Jan. 17, 2006

(54) METHOD AND APPARATUS FOR CONTROLLING THE OPTICAL HEAD DURING OCCURING OF AN OBSTACLE

(75) Inventors: Kazuhito Kurita, Kanagawa (JP); Takashi Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 422 days.

(21) Appl. No.: 10/360,477

(22) Filed: Feb. 7, 2003

(65) Prior Publication Data

US 2003/0161223 A1   Aug. 28, 2003

(30) Foreign Application Priority Data

Feb. 20, 2002 (JP) ............................ P2002-043595
Jan. 28, 2003 (JP) ............................ P2003-019277

(51) Int. Cl.
*G11B 21/08* (2006.01)
(52) U.S. Cl. .................................. 369/30.1; 369/30.27
(58) Field of Classification Search .............. 369/30.1, 369/215.1, 216, 30.11, 30.12, 30.14, 30.15, 369/30.16, 53.18, 53.12, 53.3, 44.28
See application file for complete search history.

(56) References Cited

U.S. PATENT DOCUMENTS

| | | | | |
|---|---|---|---|---|
| 5,003,522 A | * | 3/1991 | Dolby | 369/215.1 |
| 5,031,055 A | * | 7/1991 | Yanagisawa | 369/14 |
| 5,640,376 A | * | 6/1997 | Morishima | 369/53.25 |
| 6,424,606 B1 | * | 7/2002 | Okazaki et al. | 369/53.18 |

* cited by examiner

*Primary Examiner*—Tan Dinh
(74) *Attorney, Agent, or Firm*—Jay H. Maioli

(57) ABSTRACT

Apparatus for clearing of an obstacle if the smooth transfer of a head is interfered with in an apparatus for reproducing data recorded in a recording medium having address information. If an obstacle is detected, the head, which is frictionally engaged in a movable manner with a drive shaft secured to an oscillation actuator that expands and contracts in response to the application of a drive signal, is transferred by driving the oscillation actuator such that it expands and contracts at different speeds.

10 Claims, 6 Drawing Sheets

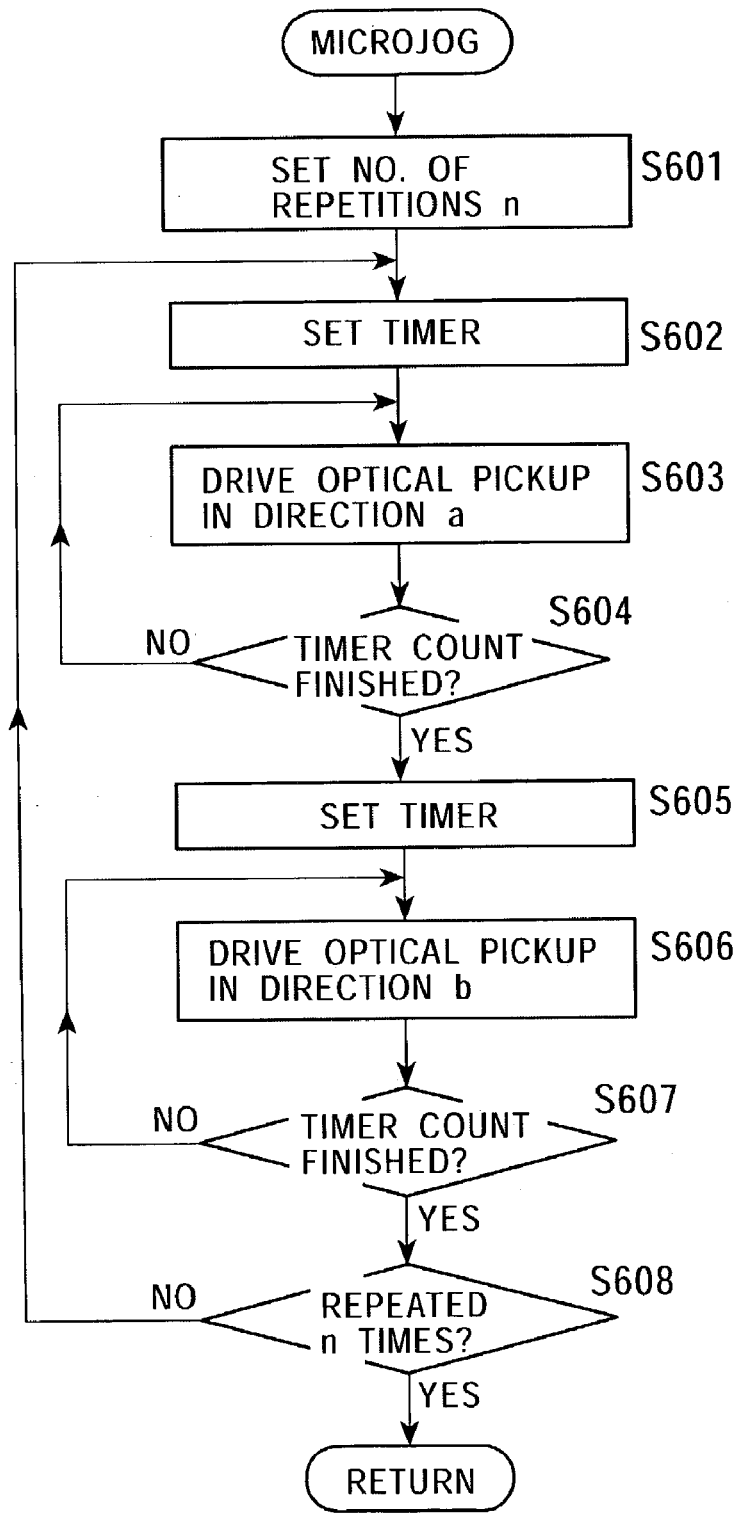

METHOD AND APPARATUS FOR CONTROLLING THE OPTICAL HEAD DURING OCCURING OF AN OBSTACLE

BACKGROUND OF THE INVENTION

1. Field of the Invention

The present invention relates to a driver for moving a movable member by driving a drive shaft with which the movable member is frictionally engaged by using a piezo element or the like controlled to expand and contract at different speeds, and a control method for the driver. More particularly, the present invention relates to a reproducing apparatus for reproducing information by drivably moving a head by driving a drive shaft with which the head is frictionally engaged by using a piezo element or the like controlled to expand and contract at different speeds, a head transfer apparatus, and a head transfer method.

2. Description of the Related Art

Hitherto, there has been known a method using the combination of a rotating motor, a rack and a pinion gear to move a read-write head in a radial direction. The read-write head is adapted to record data in a recording medium, such as a disk, and reproduce the data from the recording medium. The head fixed to the rack moves as the pinion gear fixed to the rotating shaft of a motor rotates as the motor revolves, and the rack meshed with the pinion gear moves as the pinion gear rotates.

The head driving method based on the combination of the rack, the pinion gear and the rotating motor has been disadvantageous in that it is difficult to reduce the size of the motor for obtaining an adequate motor torque for driving the pinion gear.

To solve the problem, a head transfer mechanism using an impact drive actuator has been proposed. The head transfer mechanism has an oscillating element, such as a piezo element, a drive shaft secured to one end of the piezo element, and a head frictionally engaged with the drive shaft or a frictional engagement member to which a head is secured.

This type of driver using the aforesaid conventional impact drive actuator will be described in conjunction with FIG. 1 showing the construction of the driver.

Reference numeral 1 denotes a piezo element serving as an oscillating element formed of a piezoelectric ceramic constituent, which is the impact drive actuator. A rod 2 is firmly secured by an adhesive agent or the like to one end, namely, the right end, the piezo element 1 oscillating in the right direction. A counterbalance 3 is firmly secured by an adhesive agent or the like to the other end of the piezo element 1. The counterbalance 3 is retained by a support member 4 supported by a chassis, which is not shown. The other end of the rod 2 is held by the support member 4 such that no play occurs in the shaft diameter direction, while an allowance for oscillation is provided in the axial direction.

Reference numeral 5 denotes a driven member, e.g., an optical pickup. The optical pickup 5 receives the lower surface of the rod 2 by a frictional connection surface 6 on the upper side in the drawing. The upper surface of the rod 2 is in frictional contact with a leaf spring 7, as shown in FIG. 3. This means that the optical pickup 5 frictionally holds the rod 2 between the frictional connection surface 6 and the leaf spring 7.

The optical pickup 5 has a guide shaft 8 parallel to the rod 2 and supported mainly by the chassis 9. Guide bearings 10, 10 of the optical pickup 5 are held by the guide shaft 8. Thus, the optical pickup 5 is movable in the radial direction of a disk, not shown, that is held by chucking of a spindle motor 11.

The impact drive actuator is driven by applying a square-wave voltage (FIG. 2) to the piezo element 1 to cause oscillation or the expansion and contraction to take place, thereby moving the optical pickup 5. More specifically, when the piezo element 1 slowly expands, as indicated by a waveform S1, the optical pickup 5 in frictional contact with the rod 2 moves. When the piezo element 1 instantaneously contracts, as indicated by a waveform S0, the optical pickup 5 slides and stops. This expansion and contraction is repeated to drive the optical pickup 5.

In the impact drive actuator, however, the force of friction between the rod 2 and the optical pickup 5 may change if, for example, wastes or dust stick to the rod 2 or the inertial force of the optical pickup 5 causes a frictional contact surface 6 to excessively press the rod 2. To prevent such a change, increasing the drive voltage applied to the piezo element 1 is being considered. However, in the case of a battery-driven apparatus, the voltage cannot be increased due to a restricted battery voltage. Therefore, applying a higher voltage may not be ideal corrective measures to prevent the changes in the frictional force described above.

SUMMARY OF THE INVENTION

Accordingly, it is an object of the present invention to provide a head transfer apparatus for controllably transferring a head for reading data from a recording medium, in which address information indicating a recording position has been recorded, to the vicinity of an input target address, including:

a drive shaft with which the head is frictionally engaged in a movable manner;

an oscillation actuator having one axial end thereof that expands and contracts under the application of a voltage and is secured to a fixing portion, and the other end thereof secured to the drive shaft;

a driver for transferring the head in a predetermined direction by supplying a signal for setting the expansion and contraction of the oscillation actuator at different speeds to the oscillation actuator; and a controller for carrying out control such that the oscillation actuator is driven by the driver to cause the head to be transferred alternately in one direction and the other direction, respectively, for a predetermined time if it is determined that the transfer of the head is being interfered with.

It is another object of the present invention to provide a head transfer method for controlling the transfer of a head for reading data from a recording medium in which address information indicating a recording position has been recorded to the vicinity of an input target address, the head being frictionally engaged in a movable manner with a drive shaft secured to one end of an oscillation actuator with the other end thereof fixed and expanding and contracting under the application of a drive signal, a signal for setting the expansion and contraction of the oscillation actuator at different speeds being supplied to the oscillation actuator, the method including:

a step for the oscillation actuator to drive the drive shaft for a predetermined period of time;

a step for detecting an obstacle to the transfer of the head; and a step for applying, for a predetermined number of times, a drive signal for causing the oscillation actuator to transfer the head in one direction and the other direction, respectively, for a predetermined time if an obstacle to the transfer of the head is detected.

It is yet another object of the present invention to provide a reproducing apparatus for reading data recorded at a predetermined address from a recording medium in which address information indicating recording positions has been recorded, including:

a reproducing device for reading the address information from the recording medium;

a drive shaft with which the reproducing device is frictionally engaged in a movable manner;

an oscillation actuator having one axial end thereof that expands and contracts under the application of a voltage and is secured to a fixing portion of the reproducing apparatus, and the other end thereof secured to the drive shaft;

a driver for transferring the reproducing device in a predetermined direction by supplying a signal for setting the expansion and contraction of the oscillation actuator at different speeds to the oscillation actuator;

an obstacle detector for detecting an obstacle to the transfer of the reproducing device; and a controller for controlling the driver to transfer the reproducing device by the driver alternately in one direction and the other direction, respectively, for a predetermined time if the obstacle detector detects an obstacle to the transfer of the reproducing device.

BRIEF DESCRIPTION OF THE DRAWINGS

FIG. 7 is a flowchart of a microjogging procedure.

DESCRIPTION OF THE PREFERRED EMBODIMENTS

Embodiments of a driver and a driving method in accordance with the present invention will be described with reference to the accompanying drawings, taking a driver of an optical pickup for reading data from a magneto-optical disc, as an example. The driver uses an impact drive actuator.

Figure 1:
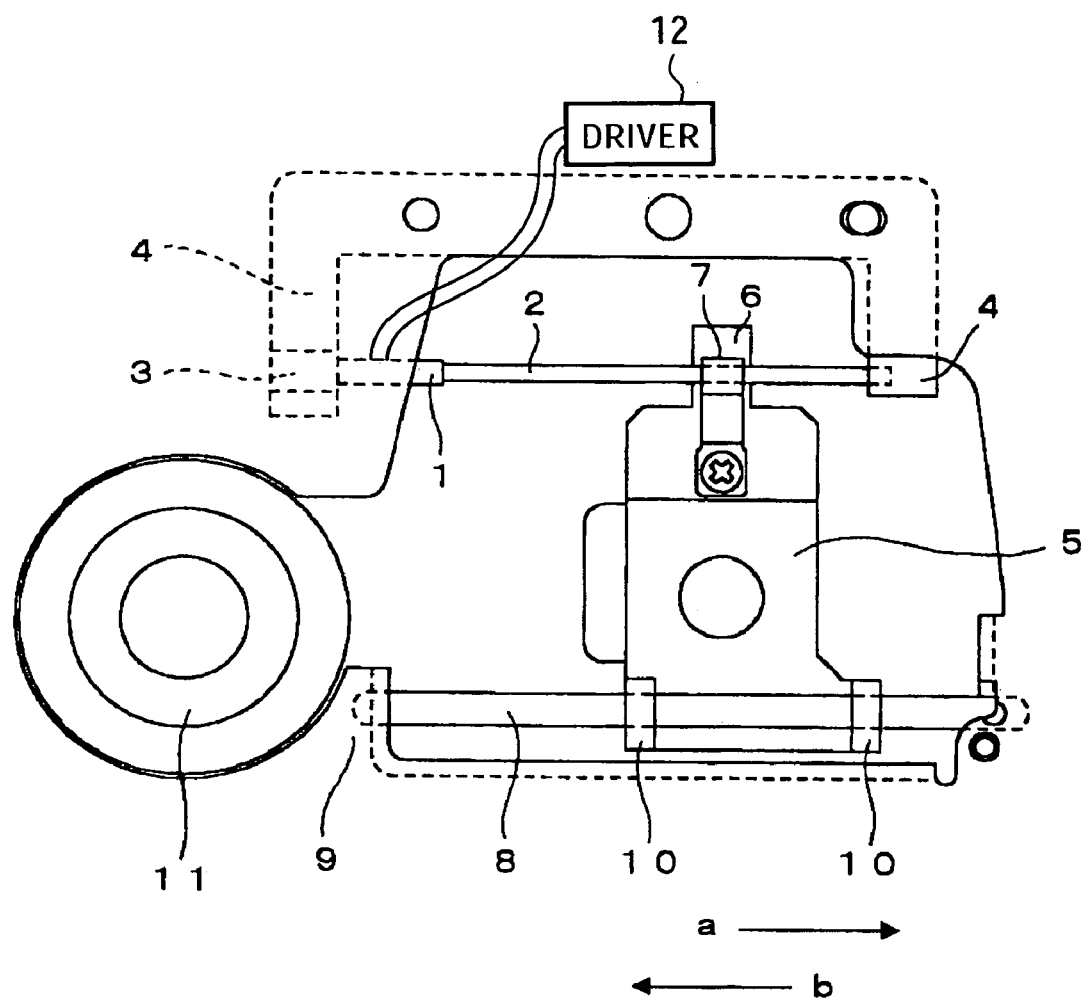
FIG. 1 is a plan view of an optical pickup using an impact drive actuator.
Figure 3:
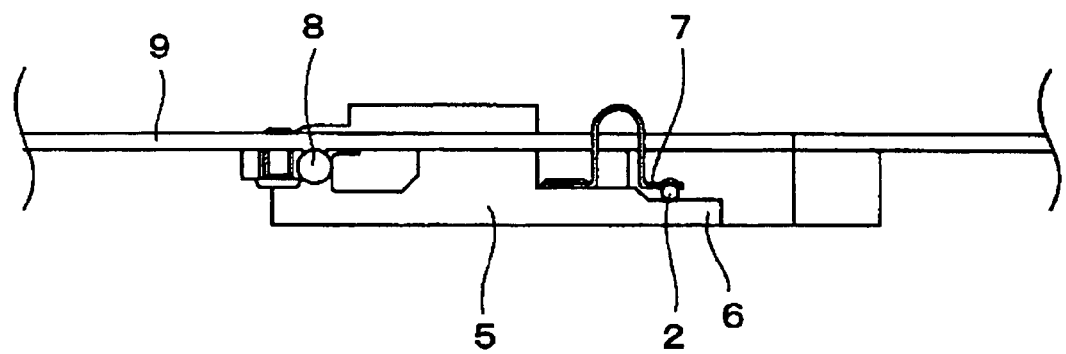
FIG. 3 is a side view of the optical pickup shown in FIG. 1.

FIG. 1 is a plan view of an optical pickup using an impact drive actuator, and FIG. 3 is a side view thereof.

Reference numeral 1 denotes a piezo element serving as an oscillating element formed of a piezoelectric ceramic constituent, which is the impact drive actuator. A rod 2 is firmly secured by an adhesive agent or the like to one end, namely, the right end in FIG. 1, the piezo element 1 oscillating in the right direction. A counterbalance 3 is firmly secured by an adhesive agent or the like to the other end of the piezo element 1. The counterbalance 3 is retained by a support member 4 supported by a chassis, which is not shown. The other end of the rod 2 is held by the support member 4 such that no play occurs in the shaft diameter direction, while an allowance for oscillation is provided in the axial direction.

Reference numeral 5 denotes a driven member, e.g., an optical pickup. The optical pickup 5 receives the lower surface of the rod 2 by a frictional connection surface 6 on the upper side in the drawing. The upper surface of the rod 2 is in frictional contact with a leaf spring 7, as shown in FIG. 3. This means that the optical pickup 5 frictionally holds the rod 2 between the frictional connecting surface 6 and the leaf spring 7.

The optical pickup 5 has a guide shaft 8 parallel to the rod 2 and supported mainly by the chassis 9. Guide bearings 10, 10 of the optical pickup 5 are held by the guide shaft 8. Thus, the optical pickup 5 is movable in the radial direction of a disk, not shown, that is held by chucking of a spindle motor 11.

Figure 2:
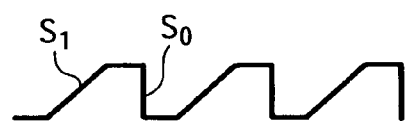
FIG. 2 is a diagram showing a square-wave pulse of the impact drive actuator.

As described above, the impact drive actuator is driven by applying a square-wave voltage generated by a driver 12, as shown in FIG. 2, to the piezo element 1 to cause oscillation or the expansion and contraction to take place, thereby moving the optical pickup 5. More specifically, when the piezo element 1 slowly expands in the direction of an arrow "a" as indicated by a waveform S1, the optical pickup 5 in frictional contact with the rod 2 moves in the direction of the arrow "a". When the piezo element 1 instantaneously contracts in the direction of an arrow "b", as indicated by a waveform S0, the optical pickup 5 slides and stops at a position reached after moving for the period of time S1 due to its inertia. This expansion and contraction is repeated to drive the optical pickup 5 in the direction indicated by the arrow "a". It is needless to say that the optical pickup 5 can be driven to move in the direction of the arrow "b" by repeating the contraction and expansion as follows. The piezo element 1 is first contracted in the direction of the arrow "b" at a speed at which the optical pickup 5 in frictional contact with the rod 2 can be moved by the frictional force in the direction of the arrow "b", then the piezo element 1 is suddenly expanded in the direction of the arrow "a."

Figure 4:
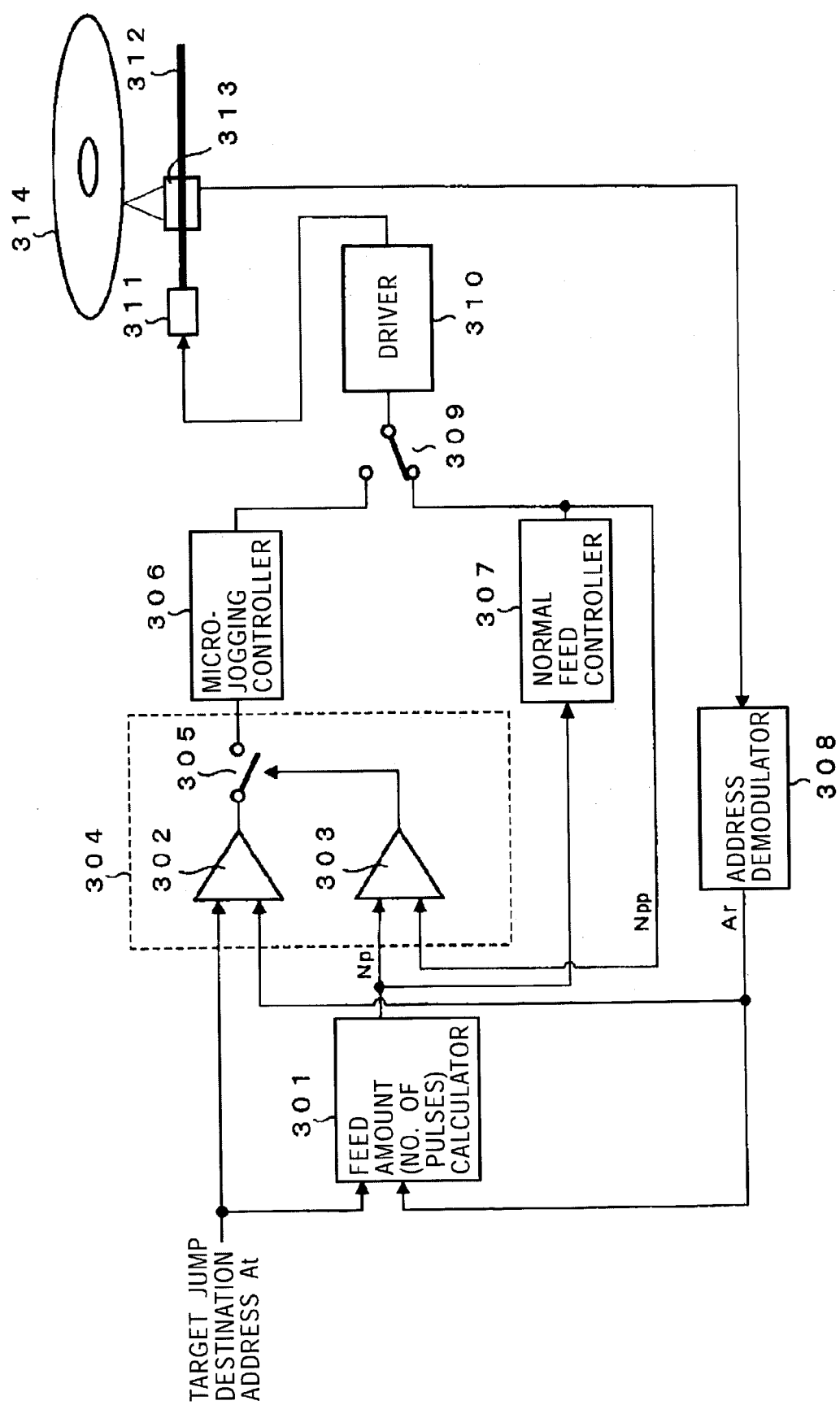
FIG. 4 is a block circuit diagram.

Referring now to FIG. 4, which is a block circuit diagram, the driver will be further described.

A target jump destination address At is supplied to a transfer amount calculator 301 and a movement amount determiner 302 of an emergency detector 304. An address demodulator 308 receives an address modulation signal recorded on a magneto-optical disk 314 read by an optical head 313 to demodulate an address signal Ar. This makes it possible to know the current reading position of the optical head 313 on the magneto-optical disk 314.

The address signal Ar output from the address demodulator 308 is supplied to the transfer amount calculator 301 in which the distance from the current point to a specified jump destination is calculated. A number of pulses Np for an actuator 311 required to move the optical head 313 to the target jump destination is output from the transfer amount calculator 301.

In a normal transfer operation of the optical head 313, a normal transfer signal is supplied from a normal transfer controller 307 to a driver 310 through the intermediary of a selector 309 on the basis of a received number of pulses Np. A drive signal for the actuator 311 is output from the driver 310 to transfer the optical head 313 on a rod 312 to a target jump destination address. In this case, the reach at the target address can be checked by the address signal Ar output from the address demodulator 308.

The following will explain a case where an obstacle prevents smooth transfer of the optical head 313.

It is assumed that address information indicating recording position on a disk for each predetermined volume of data has been allotted on the recording tracks provided in an optical disk 314, and that the position on the recording tracks being scanned by the optical head 313 can be read as address information Ar.

The same procedure as that of the normal transfer operation applies, up to the point where a drive pulse for transferring the optical head 313 to the vicinity of a target address is supplied to the actuator 311. The pulse quantity comparator 303 of the emergency detector 304 compares the number of pulses Np required to transfer the optical head 313 to the target address calculated by the transfer amount calculator 301 with a number of pulses Npp actually output from the normal transfer controller 307. Based on the result of the comparison, it is determined whether the number of pulses required for transferring the optical head 313 to the target address At has been sent to the actuator 311.

Based on the result of the comparison by the pulse quantity comparator 303, it is determined whether the difference between the address Ar of the current position of the optical head 313 determined by the movement amount determiner 302 and the target jump destination address At should be transmitted to a microjogging controller 306. More specifically, if it is determined that a predetermined number of drive pulses has been sent to the actuator 311, then a switch 305 is closed so as to cause the microjogging controller 306 to determine whether the difference between the address Ar read from the magneto-optical disk 314 and the target jump destination address At is not more than a predetermined range.

The microjogging controller 306 determines whether the received address difference lies within a predetermined range. If the difference is larger than a predetermined value, meaning that it has been determined that the optical head 313 is at a position Aerr considerably deviating from the target value At due to some obstacle, then the microjogging controller 306 supplies a predetermined number of drive pulses to the actuator 311 to carry out microjogging to clear the obstacle.

Figure 5:
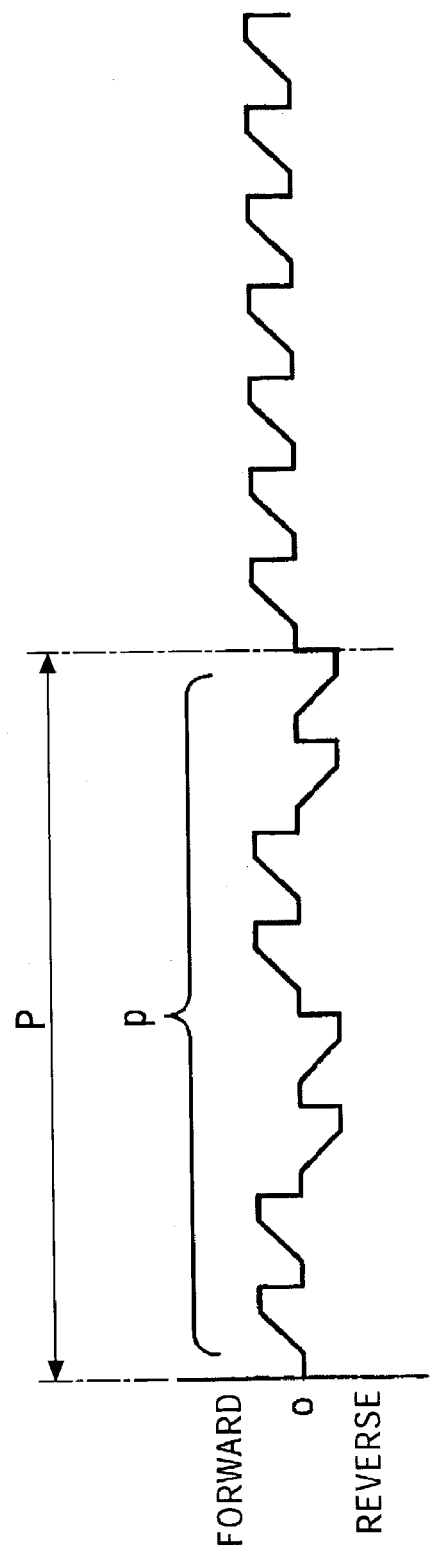
FIG. 5 is a diagram showing a square-wave pulse illustrating repeated microjogging.

If, for example, wastes or dust is on the rod 312, or clinging or the like takes place between the rod 312 and the optical head 313, then a square-wave pulse signal p is repeatedly applied for a short time to the piezo element in the forward and reverse directions to perform microjogging in a period P, as shown in FIG. 5. This will clear the wastes or dust, or the clinging or the like between the rod 312 and the optical head 313, allowing the optical head 313 to smoothly move to the target jump destination. In other words, the signal shown in FIG. 5 is applied to the piezo element 1 shown in FIG. 1 so as to repeatedly drive the optical head 5 in the direction indicated by arrow A and the direction indicated by arrow B, respectively, for a short time.

The selector 309 is controlled by the microjogging controller 306 such that it switches to connect the microjogging controller 306 with the driver 310 only when the microjogging controller 306 is ready to output a pulse. Alternatively, the control may be carried out by a CPU or the like in place of the selector 309.

Figure 6:
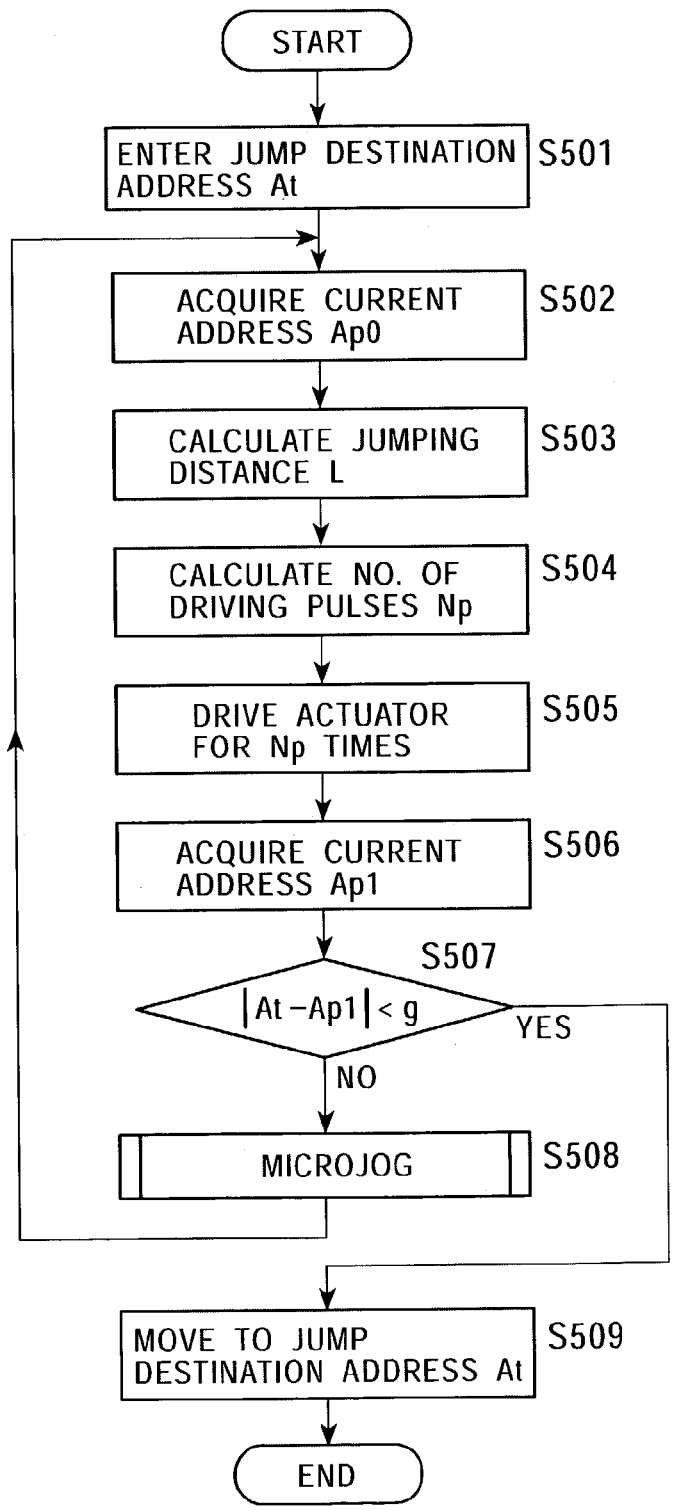
FIG. 6 is a flowchart of a control procedure.

FIG. 6 is a flowchart illustrating a control procedure.

In S501, a target jump destination address At is received. In S502, an address Apo on a magneto-optical disk at which an optical head can current read data is acquired. Then, in S503, a distance L is calculated on the basis of the addresses At and Apo obtained in S501 and S502, respectively.

In S504, based on the distance L calculated in S503, the number of times the actuator is driven, i.e., the number of pulses Np is calculated. Next, in S505, based on the number of pulses Np calculated in S504, the actuator is driven the number of pulses Np times to transfer the optical head to the target address. After the actuator is driven for the number of pulses Np, an address Ap1 read from the magneto-optical disk is acquired in S506 in order to check the current position of the optical head.

Subsequently, in S507, it is determined whether the difference between the target address At and the address Ap1 actually read from a disk is a predetermined value g or less. If it is determined that the difference between the target address and the actually read address is the predetermined value or less, then it means that the optical head has normally reached the vicinity of a target jump destination. Hence, a fine adjustment is made to transfer the optical head to the target position in S509. This terminates the procedure.

If, however, it is determined in S507 that the difference between the target address At and the address Ap1 actually read from the disk exceeds the predetermined value g, then a microjogging operation p explained in conjunction with FIG. 5 is performed in S508, then the processing is repeated from S502. Since the immediately preceding address Ap1 has been acquired in S506, this address may be used to calculate the moving distance L to resume the processing from S504, rather than repeating the processing from S502.

FIG. 7 is a flowchart of the microjogging operation carried out in S508.

To repeatedly apply a square-wave pulse signal in forward and reverse directions in a short time to the piezo element 1 to apply a drive wave p thereto, as previously described, the number of repetitions n is first set in S601. Using the timer that has been set in S602, the optical pickup is driven in the moving direction "a" shown in FIG. 1 in S603. In the microjogging operation of the optical pickup, it is determined in S604 whether the count on the timer has been finished, and if it is determined that the timer count has been finished, then the optical pickup is driven in the moving direction b shown in FIG. 1 in S606 on the basis of the setting on the timer made in S605. In the operation for driving the optical pickup, it is determined in S607 whether the timer count has been finished, and if it is determined that the timer count has been finished, then it is further determined in S608 whether the drive in the two directions has been repeated n times. If it is determined that the drive has been repeated n times, then the procedure is terminated.

The present invention is not limited to the embodiment described above in conjunction with the accompanying drawings. It is to be understood that the invention is capable of changes or modifications within the scope of the inventive concept as expressed herein.

For instance, in the present invention, the target positions are the vicinities of the positions where recorded data is read. Alternatively, the target positions may be set to the vicinities of the current position of a head in order to detect the presence of an obstacle, rather than the vicinities of the positions where recorded data is read. In this case, quick transfer is carried out, and it is determined whether the head has been transferred to the vicinity of a target address. This is advantageous when the transfer of a head requires a longer time, as in the case of transferring the head from the innermost periphery to the outermost periphery of a magneto-optical disk. More specifically, it is quicker than detecting an obstacle after completing such a prolonged transfer to first detect the presence of any obstacle by carrying out a shorter transfer operation to check for failure. Thus, the time required for the head to be transferred to a final target point where recorded data is read can be shortened.

In the embodiment discussed above, the descriptions have been given of the case where an obstacle interferes with smooth transfer of the optical pickup or the optical head. It is alternatively possible to microjog the optical pickup as necessary when the power is turned ON thereby to perform smooth transfer thereof.

In the foregoing embodiment, the descriptions have been given of the driving apparatus and method for the optical pickup adapted to read data from a magneto-optical disk by using the impact drive actuator. The present invention, however, can be extensively applied also to other types of optical heads and magnetic heads that use impact drive actuators. Obviously, the recording media from which data is read are not limited to magneto-optical disks, but may be magnetic disks or optical disks.

Thus, according to the inventive driving apparatus and method, if smooth drive of a driven member with respect to a rod is prevented by undue friction, the rod is repeatedly microjogged for a short time in forward and reverse directions by an oscillating element under the control of a microjogging controller so as to remove wastes or dust from the rod or to clear the clinging or the like between the rod and the optical pickup, permitting smooth start of the optical pickup. The features of the present invention make it possible to achieve highly reliable head transfer apparatus and method, and a highly reliable reproducing apparatus.

What is claimed is:

1. A head transfer apparatus for controllably transferring a head, for reading data from a recording medium in which address information indicating a recording position has been recorded, to a vicinity of an input target address, the head transfer apparatus comprising:
    drive shaft means frictionally engaged in a movable manner with the head;
    oscillation actuator means having one axial end thereof that expands and contracts upon application of a voltage and being secured to a fixing portion, an other end of the oscillation actuation means being secured to the drive shaft means;
    driving means for transferring the head in a predetermined direction by supplying a signal for setting the expansion and contraction of the oscillation actuator means at different speeds to the oscillation actuator means; and
    controlling means for carrying out control such that the oscillation actuator means is driven by the driving means to cause the head to move alternately in one direction and in an other direction for a predetermined time when it is determined that a transfer of the head is being interfered with.

2. The head transfer apparatus according to claim 1, wherein an obstacle to the transfer of the head is detected based on address information indicating a current position of the head and address information read after the oscillation actuator means is driven for a predetermined period of time.

3. The head transfer apparatus according to claim 1, further comprising:
    signal quantity calculating means for calculating a quantity of signals to be applied to the oscillation actuator means that is required for transferring the head to a vicinity of a target address based on the target address that is input and a current address read by the head; and
    transfer completion detecting means for detecting that the head has reached the vicinity of the input target address based on the input target address and the current address read by the head,
    wherein the controlling means controls the driving means to transfer the head based on a calculation result of the signal quantity calculating means and checks for an obstacle to the transfer of the head based on a detection result of the transfer completion detecting means.

4. A head transfer method for controlling the transfer of a head, for reading data from a recording medium in which address information indicating a recording position has been recorded, to a vicinity of an input target address, the head being frictionally engaged in a movable manner with a drive shaft secured to one end of an oscillation actuator with an other end thereof fixed and expanding and contracting under the application of a drive signal, the drive signal for setting the expansion and contraction of the oscillation actuator at different speeds being supplied to the oscillation actuator, the method including:
    a step in which the oscillation actuator drives the drive shaft for a predetermined period of time;
    a step of detecting an obstacle to the transfer of the head; and
    a step of applying, for a predetermined number of times, a drive signal for causing the oscillation actuator to transfer the head in one direction and an other direction for a predetermined time when an obstacle to the transfer of the head is detected in the step of detecting.

5. The head transfer method according to claim 4, wherein an obstacle to the transfer to the head is detected by reading address information indicating a current position of the head and reading address information after the oscillation actuator is driven for a predetermined period of time.

6. The head transfer method according to claim 4, further comprising:
    a drive quantity calculation step for calculating a quantity of drive signals for transferring the head to the vicinity of the input target address from a current position of the head based on the input target address and the current address read by the head,
    wherein the oscillation actuator is driven based on a calculation result of the drive quantity calculation step.

7. The head transfer method according to claim 6, wherein an obstacle to the transfer of the head is detected based on address information indicating the current position of the head and address information read after the oscillation actuator is driven for a predetermined period of time.

8. A reproducing apparatus for reading data recorded at a predetermined address from a recording medium in which address information indicating recording positions has been recorded, the reproducing apparatus comprising:
    reproducing means for reading the address information from the recording medium;
    drive shaft means frictionally engaged in a movable manner with the reproducing means;
    oscillation actuator means having one axial end thereof that expands and contracts upon application of a drive signal and that is secured to a fixing portion of the reproducing apparatus, an other end thereof being secured to the drive shaft means;
    driving means for transferring the reproducing means in a predetermined direction by supplying a signal for setting the expansion and contraction of the oscillation actuator at different speeds to the oscillation actuator means;
    obstacle detecting means for detecting an obstacle to the transfer of the reproducing means; and
    controlling means for drivably controlling the drive shaft means to transfer the reproducing means by the driving means alternately in one direction and an other direction for a predetermined time when the obstacle detecting means detects an obstacle to the transfer of the reproducing means.

9. The reproducing apparatus according to claim 8, wherein the obstacle detecting means detects an obstacle based on information on the address at a beginning of a drive of the reproducing means and address information read from the reproducing means after a predetermined drive is carried out.

10. The reproducing apparatus according to claim 8, further comprising:

drive signal quantity calculating means for calculating a quantity of drive signals required for transferring the reproducing means to a vicinity of a predetermined address based on address information on a current position reproduced from the reproducing means and the predetermined address, wherein the controlling means carries out control such that obstacle detection by the obstacle detecting means is performed after the driving means is drivably controlled based on a calculation result of the drive signal quantity. calculating means.

* * * * *